United States Patent
Cavaliere et al.

(10) Patent No.: US 6,820,835 B2
(45) Date of Patent: Nov. 23, 2004

(54) APPARATUS AND METHOD FOR COUPLING AND DRIVING A REEL SHAFT

(75) Inventors: Vinny Cavaliere, Monroe, CT (US); Alex Shafir, Watertown, CT (US); Tim Dennison, Wappinger Falls, NY (US)

(73) Assignee: Sealed Air Corporation, Saddle Brook, NJ (US)

( * ) Notice: Subject to any disclaimer, the term of this patent is extended or adjusted under 35 U.S.C. 154(b) by 0 days.

(21) Appl. No.: 10/308,232

(22) Filed: Dec. 2, 2002

(65) Prior Publication Data

US 2004/0104298 A1 Jun. 3, 2004

(51) Int. Cl.[7] .............................................. B65M 16/02
(52) U.S. Cl. .................... 242/545; 242/559.4; 242/564; 242/596.4; 242/596.5; 242/596.6
(58) Field of Search .............................. 242/545, 559.4, 242/564, 596.4–596.6

(56) References Cited

U.S. PATENT DOCUMENTS

| | | |
|---|---|---|
| 1,332,329 A | 3/1920 | Gammeter |
| 1,929,036 A | 10/1933 | Reagles |
| 2,028,492 A | 1/1936 | Bebie |
| 2,208,545 A | 7/1940 | Mackey |
| 2,332,293 A | 10/1943 | Blodgett |
| 3,080,185 A | 3/1963 | Walker et al. |
| 3,132,817 A | 5/1964 | Atwood et al. |
| 3,368,767 A | 2/1968 | Schmidt |
| 3,497,149 A | 2/1970 | L'Allemand |
| 3,884,428 A | 5/1975 | Gretener |
| 4,008,860 A | 2/1977 | Tanaka |
| 4,438,554 A | 3/1984 | Sciola et al. |
| 5,322,234 A | 6/1994 | Robert et al. |
| 5,829,713 A | 11/1998 | Kewin |
| 6,003,288 A | 12/1999 | Sperry et al. |
| 6,193,186 B1 | 2/2001 | Kewin |
| 6,273,360 B1 | 8/2001 | Robinson |
| 6,478,504 B1 | 11/2002 | Dawson |

FOREIGN PATENT DOCUMENTS

EP            1 182 158 A        2/2002

Primary Examiner—Kathy Matecki
Assistant Examiner—Sang Kim
(74) Attorney, Agent, or Firm—Alston & Bird LLP

(57) ABSTRACT

A device for rotating a web material roll supported on a reel shaft having a pair of ends. The rotating device includes a female drive member coupled to one end of the reel shaft and defining an opening having a non-circular perimeter, such as a square opening. Also included is a male drive device having a rotatably powered drive shaft having an end that is congruent to the non-circular perimeter of the opening in the female drive member. The non-circular perimeter allows the reel shaft, and web material roll, to be positively rotated during unwinding. A telescoping assembly of the male drive device is capable of extending the drive shaft into the opening so as to allow co-rotation of the shaft and female member. An optional roll supporting cart may be employed to rotatably support the web material roll when aligning the male and female drive members.

29 Claims, 6 Drawing Sheets

APPARATUS AND METHOD FOR COUPLING AND DRIVING A REEL SHAFT

BACKGROUND OF THE INVENTION

1. Field of the Invention

The present invention is related to devices for supplying web material in production processes, and more particularly to unwinding web material from a roll.

2. Description of Related Art

Generally, manufacturers and distributors can realize economic benefits by increasing the rate at which products are packaged prior to sale or further distribution. Webs or sheets of polymeric or paper materials are often used in the packaging process, such as for filler within a container, or as external protective wrapping for the product or container. During such processes, the web or sheet material is dispensed from a roll for construction into the filler material or application to the outside of the product or container. Therefore, increases in the throughput of such packaging processes generally requires either an increase of the rate at which the web or sheet material is dispensed or a reduction in downtime when exchanging rolls of web material. One way of reducing downtime is to use very large rolls of web material, sometimes referred to as "jumbo rolls" by those of skill in the art.

In one example of the packaging processes described above, U.S. Pat. No. 6,003,288 to Sperry et al. ("Sperry") discloses a packaging device that forms cushions of the type that include a plastic bag filled with a solid foam. FIG. 1 of Sperry shows the packaging device 20 mounted on a frame having lower portions 22 and upper portions 23. The device includes a first rotatable shaft 24 and a second rotatable shaft 26 for advancing a folded sheet of plastic film onto an injecting device 32 for filling with foam material. The plastic film is supplied from a stock supply roll 61 which is mounted in a pair of receiving chutes 71, as shown in FIG. 9 of Sperry. The roll of plastic film is supported by a reel shaft 60 having a core plug 56 at each end. The core plug has a spring-biased, telescoping support portion 66 that is biased to protrude out beyond the end of the roll. A plunger 80 is used to urge the support portion inwards, against the bias of the spring, to release the roll from the chute after the supply of film has been depleted. The packaging device disclosed in Sperry has the advantage of promoting easy handling of the plastic film rolls via the receiving chute and the telescoping core plug which minimizes exchange time and also allows for larger rolls that reduce exchange frequency. Despite such advantages, additional improvements in web material roll unwinding that increase efficiency of the packaging process are desirable. In addition, the telescoping support portion supports the stock supply roll, but does not positively drive the supply roll, which would lead to an additional increase in packaging production speed.

Therefore, it would be desirable to have a device and method for efficiently unwinding rolls of web material in packaging and other processes requiring supply of web material at high rates. It would be further desirable if large rolls of material were useable with the device and method in order to minimize the frequency of downtime. In addition, it would also be advantageous to combine low-frequency downtime with ease of exchanging depleted web material rolls with new web material rolls. It would be further advantageous to have a positively driven supply roll for supplying web material at high rates.

BRIEF SUMMARY OF THE INVENTION

The present invention addresses the above needs and achieves other advantages by providing a device for positively driving a web material roll supported on a reel shaft having a pair of ends. The rotating device includes a female drive member coupled to one end of the reel shaft and defining an opening having a non-circular perimeter, such as a square or triangular opening. Also included is a male drive device having a rotatably powered drive shaft having an end that is congruent to the non-circular perimeter of the opening in the female drive member. The non-circular perimeter allows the reel shaft, and web material roll, to be positively rotated during unwinding. A telescoping assembly of the male drive device is capable of extending the drive shaft into the opening so as to allow co-rotation of the shaft and female member. An optional roll supporting cart may be employed to rotatably support the web material roll when aligning the male and female drive members.

In one embodiment, the present invention includes a device for rotating a web material roll supported on a reel shaft having a pair of ends. Included in the rotating device are a support frame and a female, and male, drive members. The support frame is configured to rotatably support the reel shaft and the web material roll supported on the reel shaft. Coupled to one end of the reel shaft is a female drive member that defines a receptacle which has a non-circular perimeter. The male drive device includes a motor configured to rotate a drive shaft wherein the drive shaft has at least an end with a non-circular perimeter. The non-circular perimeter of the drive shaft is congruent to the non-circular perimeter of the receptacle defined in the female drive member and is engaged therein. Further included in the male drive device is a telescoping mechanism that is capable of slidably engaging and retracting the drive end of the shaft from the receptacle. When engaged in the receptacle, the shaft is capable of rotating the reel shaft and dispensing the web material from the web material roll.

The non-circular perimeter coupling preferably has a square shape with four corners and flat surfaces so as to promote co-rotation of the drive shaft and the female member. Preferably, the drive shaft has a pulley at an end opposite the female member that is connected to a motor, such as via a belt, for rotating the drive shaft.

Optionally, the telescoping mechanism may include a second drive shaft rotatably driven by the motor and defining an axially extending opening at one end. An end of the first drive shaft opposite the drive end is slidably engaged within the opening of the second drive shaft. Extending axially along the second drive shaft is a slot within which a protuberance, such as a peg or transfixing pin, of the first drive shaft extends. The edges of the drive shaft defining the slot limit the sliding motion of the first drive shaft within the second drive shaft. A linkage may be coupled to the first drive shaft and operable to advance and retract the first drive shaft within the axially extending opening of the second drive shaft.

Mounted on one end of the second drive shaft, opposite the end defining the opening holding the first drive shaft, may be a pulley connected by a drive belt to the motor. In this arrangement, the second drive shaft is rotatably supported by a pair of aligned bearings.

The female drive member is preferably a plug fitted into an open end of the reel shaft. In another aspect, the plug includes a key that extends into a slot defined in a wall of the reel shaft so as to secure the plug against rotation within the shaft. In another option, the plug may be recessed within the open end of the reel shaft. In such a case, the drive shaft includes a base portion fitted to extend between inner wall surfaces of the reel shaft. The recessed plug and base portion allow the reel shaft to be suspended from the drive device in a cantilever arrangement.

The present invention has many advantages, including provision of a drive coupling between shaft and opening each having a non-circular perimeter that promotes co-rotation of the drive shaft assembly and reel shaft. Overall, positively driving the unwinding process allows the use of heavy jumbo rolls which minimizes frequency of downtime during roll exchange. The use of a telescoping shaft assembly on the male drive device allows the female drive plug to have a relatively simple, and cost-effective construction, unlike some prior art telescoping core plugs. The engagement linkage advantageously can be locked into a position wherein the first shaft is engaged within the opening of the female member.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
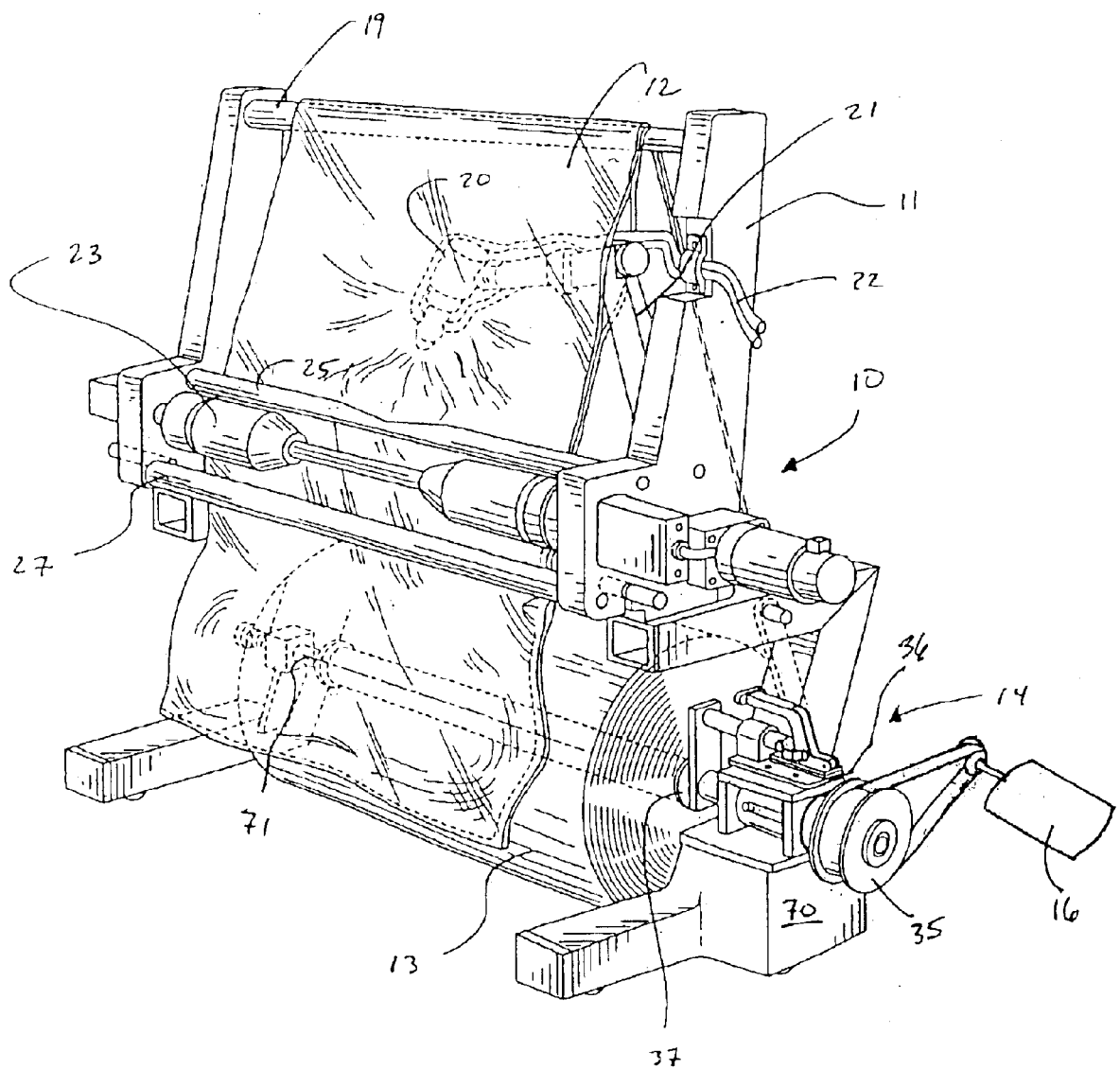
FIG. 1 is a perspective view of a packaging device for manufacturing foam-filled bags used in packaging processes.

A packaging device 10 supported by a frame 11 is fed a web of plastic material 12 off of a web material roll 13 by an unwinding device 14 of one embodiment of the present invention, as shown in FIG. 1. The packaging device 10 forms packaging cushions that are constructed of a plastic-encapsulated foam. Generally, the cushions are formed by filling plastic bags with a foamable material that reacts and then hardens into a solid foam. The plastic bags are formed of plastic web material 12 that has been folded along its center and fed into the packaging device 10.

The web material 12 that is dispensed, or unwound, from the web material roll 13 is a sheet of plastic film material that has been center-folded to form a doubled web with one closed edge defined by the center fold and one open edge defined by the adjacent free edges of the sheet. Although the unwinding device 14 of the illustrated embodiment is shown dispensing web material into a cushion-forming apparatus, the unwinding device may also be applicable to other devices requiring a continuous feed of web materials. For instance, other types of packaging devices may require a supply of shrink-wrap packaging material that is wrapped around a product before it is sent through a heat tunnel. Other web types could also be unwound from a roll, such as a paper or foil web used to supply a packaging or manufacturing device. Notably, the unwinding device could also have reversed rotation for winding and forming the web material roll 13 in a different application, such as windup of a plastic film packaging material.

As it is unwound, the center-folded web 12 of film material extends up and over an idler roller 19 and then downwards towards a foam injecting gun or nozzle 20. The foam injecting gun is held to the frame 11 by a bracket 21 and includes supply hoses 22 for supplying foamable precursors. In particular, the bracket holds the foam injecting gun 20 between the plies of the film web 12 so that it can spray the foamable precursors between the web plies.

Figure 2B:
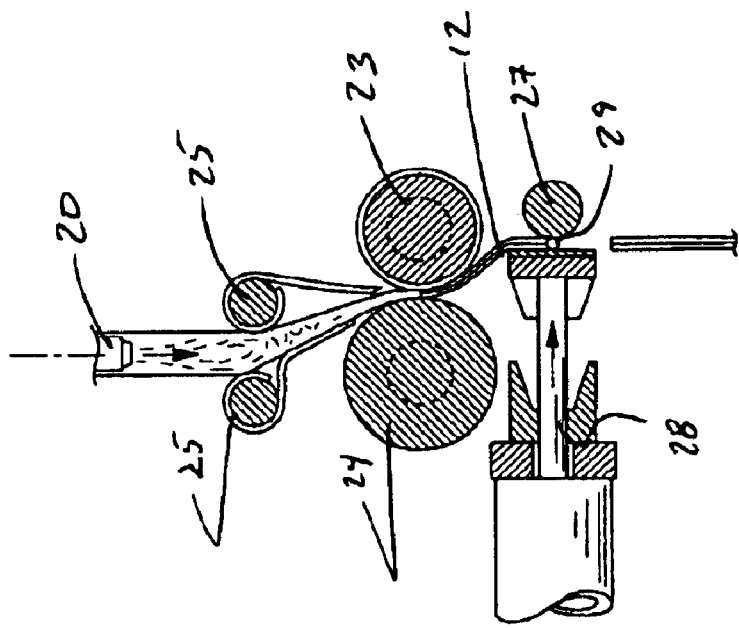
FIGS. 2A and 2B are sectional views of a device for severing foam-filled bags from a continuous web of center-folded film material being filled with foam by the packaging device of FIG. 1.
Figure 2A:
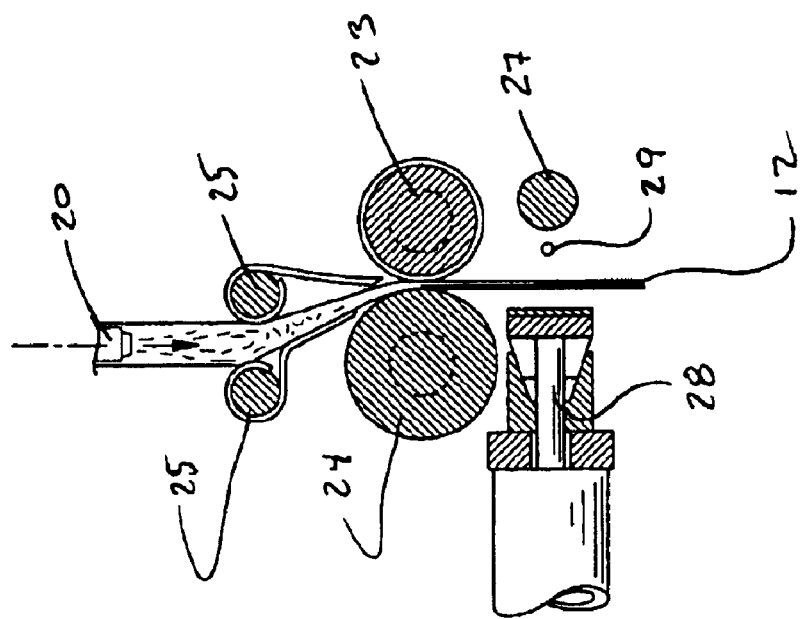

As the foamable precursors are sprayed between the web 12 plies, the web is advanced between a pair of guide bars 25 by a drive roller 23 in nipping engagement with a driven roller 24, as shown in FIG. 2A. The driven roller 24 includes a sealing wire (not shown) extending around its circumference at the edge the film web 12 having the free ends and is heated to seal the free ends as the film web is advanced by the drive and driven rollers. Further downstream, and below the drive and driven rollers, 23 and 24, is positioned an actuator bar 28 and another sealing wire 29 on opposite sides of the film web 12. After a predefined length of the web 12 is advanced through the rollers 23, 24, the actuator bar 28 presses the film web against the sealing wire, as shown in FIG. 2B, so as to create a discrete cushion. Additional detail on the operation of the packaging device 10 is disclosed in commonly assigned U.S. Pat. No. 6,003,288 to Sperry et al. which is incorporated herein by reference.

Figure 3:
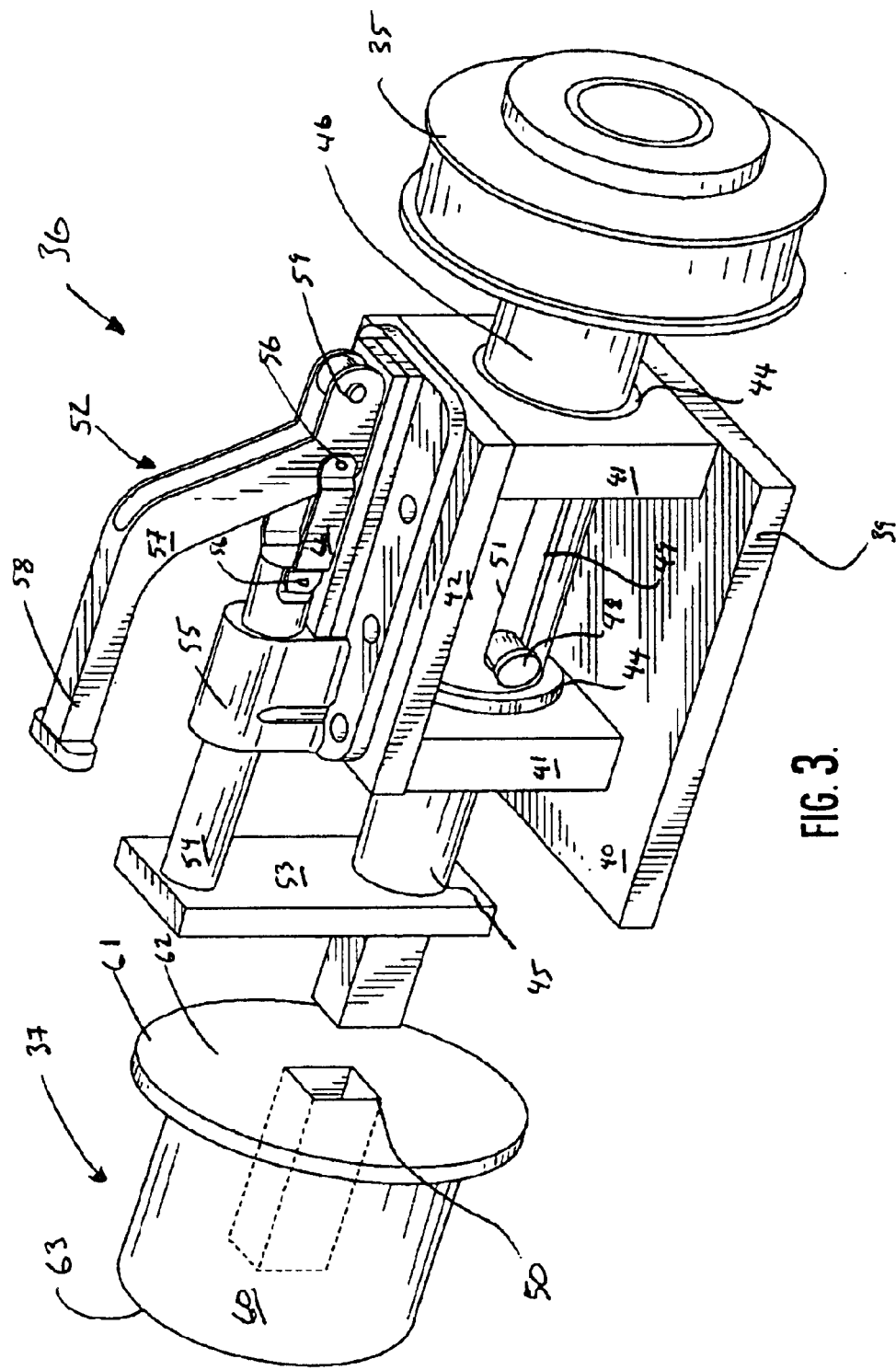
FIG. 3 is a perspective view of a square drive mechanism of an embodiment of the present invention including a male drive device for engaging and driving a female drive core plug.
Figure 4:
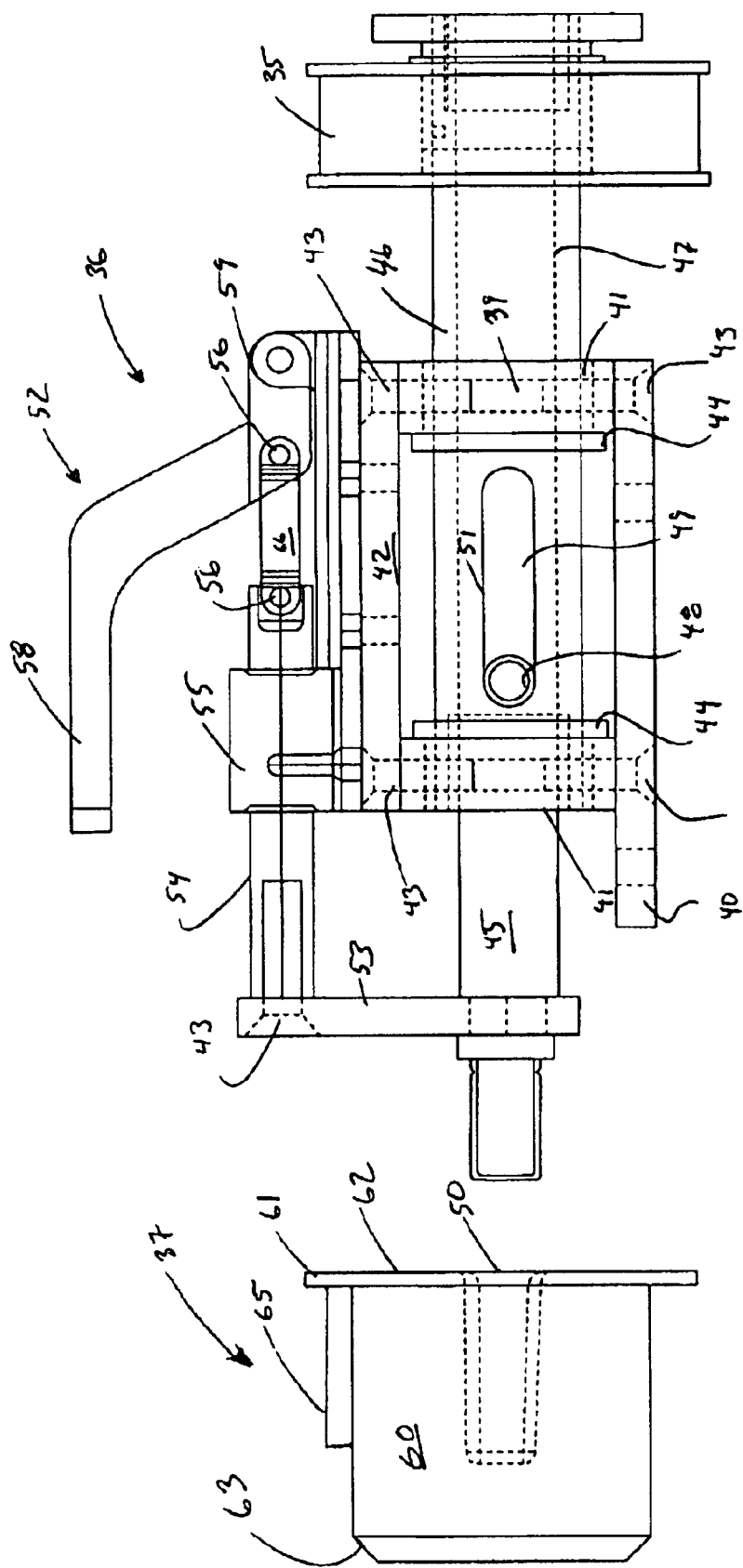
FIG. 4 is a square drive mechanism of another embodiment of the present invention wherein the female drive core plug includes a key for engaging a complementary slot defined in a wall material of a reel shaft.

The unwinding device 14 includes a male drive apparatus 36 that cooperates with a female drive plug 37 housed in an end of a hollow, tubular reel shaft 38 which supports the web material roll 13, as shown in FIGS. 3 and 4. The male drive apparatus 36 includes a support stand 39 that has a bottom plate 40 a pair of vertical plates 41 and a top plate 42. The vertical plates 41 are spaced across the bottom plate 40 and are attached thereto by a plurality of bolts 43 shown in invisible lines. Each of the vertical plates 41 defines a hole extending through its front and rear main faces for housing therein a respective one of a pair of bearings 44. The holes in the vertical plates, and the bearings housed therein, are aligned with each other. Attached to the vertical plates 41 by additional bolts 43 is the top plate 42 which extends generally parallel to the bottom plate 40.

Figure 5:
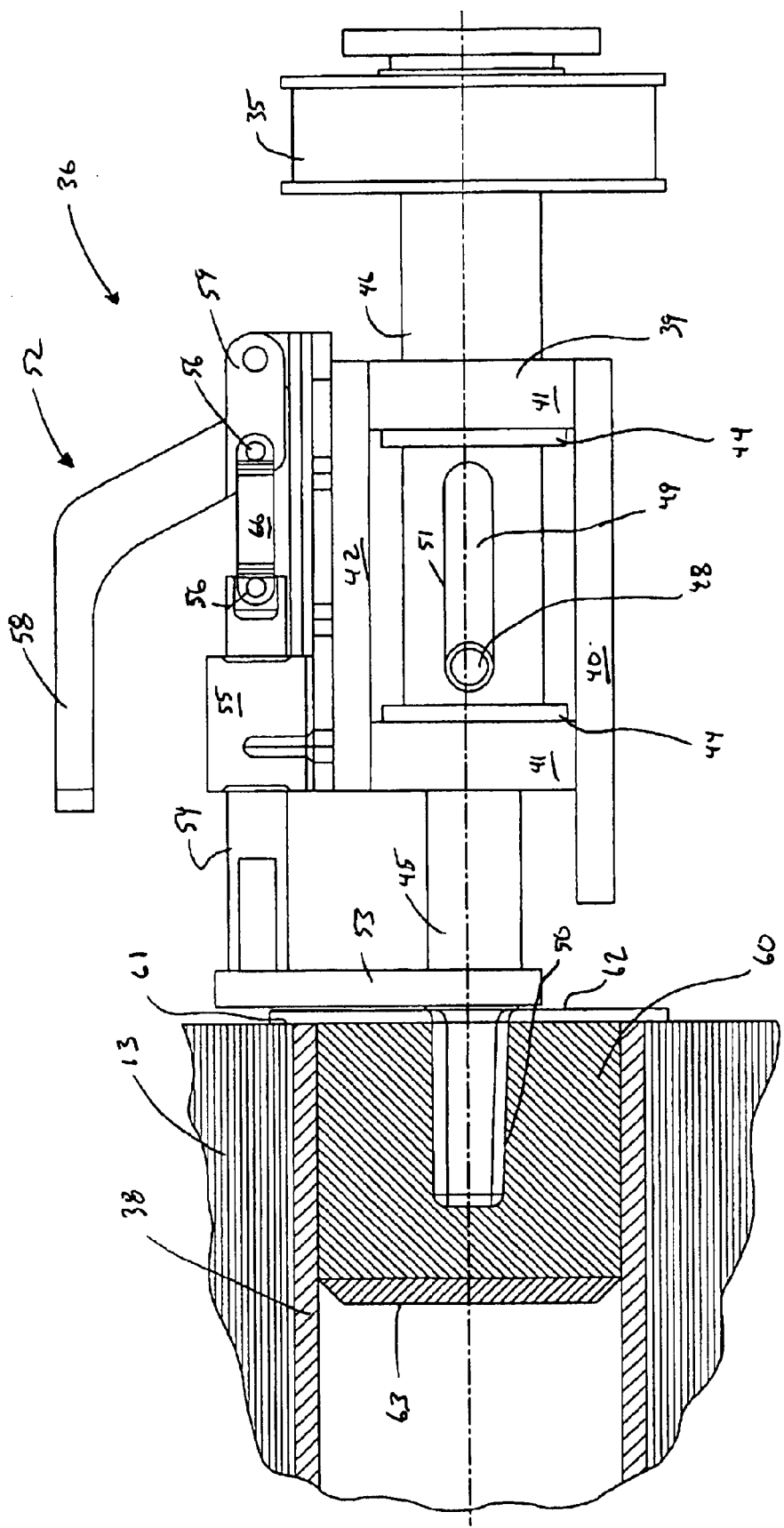
FIG. 5 is a partial sectional view of the square drive mechanism of FIG. 3 with the male drive shaft engaged in the female core plug.

A telescoping shaft assembly of the male drive apparatus 36 is supported by the bearings 44 and includes a first and second shafts, 45 and 46, respectively. The first shaft 45 preferably has a square end that engages a congruently shaped, and sized, square opening 50 defined in the female drive plug 37, as shown in FIG. 5. Engagement of the first shaft 45 and the opening 50 will be described in more detail below. The second shaft 46 extends through, and is rotatably supported by, the aligned bearings 44 and thereby indirectly supports the first shaft 45 which is housed in the second shaft.

In particular, extending the length of the second shaft 46 is a longitudinal opening 47 within which is slidably housed the first shaft 45. Sliding, or telescoping, movement of the first shaft is limited by a cylindrical peg 48, pin or other protuberance which extends into, and slides along, a slot 49 defined through the wall of the second shaft 46. The slot includes closed front and back ends that restrain the movement of the peg 48 and thereby provides a pair of endpoints for movement of the first shaft 45. If desired, additional pegs may be used to limit the telescoping motion of the first shaft 45. Also, the pegs need not be cylindrical in shape, although the cylindrical shape is congruent to the rounded ends of the slot 49 so as to provide an even pressure distribution between the peg and outer, second shaft 46.

At the other end of the second shaft 46, opposite the first shaft 45, is mounted a cylindrical drive pulley 35 which is preferably belt-driven using an electrical motor 16. Rotational power applied to the second shaft 46 is transmitted to the first shaft 45. In particular, a pair of elongate edges 51 of the second shaft 46 defining the slot 49 transmit rotation of the second shaft to the first shaft 45 through contact with the peg 48 which extends into the opening, and adjacent the elongate edges. It should be noted that other types of drive motors and transmissions can be used to provide rotational power to the shaft assembly, such as a combustion engine with a chain drive. In addition, it should be noted that the first shaft 45 may have other structure, such as by being non-circular and congruent to the inside of the surrounding second shaft 46, that allows it to transmit rotation while still allowing relative telescoping movement.

Supported on the top plate 42 of the support stand 39 is a linkage 52 that when combined with the telescoping characteristics of the shaft assembly, forms an engagement mechanism for the drive device 36. The engagement linkage, as shown in FIGS. 3–5, includes a vertical plate 53 fixed to the first shaft 45 and extending upwards from, and at a right-angle to, the first shaft. One of the bolts 43 attaches a top end of the vertical plate 53 to a reciprocating member 54 which extends through a collar 55 and slides therein. The reciprocating member 54 and an opening defined in the collar 55 are preferably cylindrical, but may also have other shapes as long as relative sliding motion between the two is possible.

The collar 55 is attached to the top plate via another one of the bolts 43. At its other end, the reciprocating member 54 is attached to a swivel member 66 via a fastener 56 about which the swivel member rotates with respect to the reciprocating member. The other end of the swivel member 66 is attached via another fastener 56 to a hand lever 57. The hand lever itself includes a grip portion 58 that in a locked-down position extends parallel to the drive shaft assembly and may be pulled backwards, away from the female core plug 37, until extending in a generally upwards position. At its base, the hand lever 57 also includes a pivot attachment 59 that is fixed to the swivel member 66 at the aforementioned fastener 56 and is also fixed by another fastener 56 to the top plate 42 which is spaced rearwardly from the swivel member.

The female drive plug 37 includes a cylindrical body 60 and a flange 61 extending about a first end 62 of the body. A second end 63 of the body has a chamfer defined about its circumferential periphery. The cylindrical body 60 is sized, and shaped, to have an interference fit into a cylindrical opening 64 of the reel shaft 38, as shown in FIG. 5. Such an interference fit promotes co-rotation of the reel shaft with the drive plug 37. Alternatively, the drive plug 37 and the opening 64 of the shaft may have a non-circular perimeter to facilitate co-rotation. As another alternative, the drive plug 37 could also include a key 65 that is sized to fit within a slot defined within the wall structure of the reel shaft 38, as shown in FIG. 4. It should also be noted that the female drive plug 37 could be integrally formed with the reel shaft 64 in order to ensure co-rotation. For instance, the reel shaft 64 could be constructed of a solid, extruded shaft of a polymer with the square opening 50 defined therein. In still another alternative, an adhesive, bonding or welding process could be employed to bind the female drive plug 37 within the end of the reel shaft 38.

The flange 61 extends outwards from the center of the body 60 and, when the female drive plug 37 is seated within the opening 64 of the reel shaft 38, it extends over the adjacent wall material of the reel shaft. Advantageously, the flange 61 prevents the female drive plug 37 from being inserted too far into the opening 64 of the reel shaft 38 and thereby rendering the plug difficult to remove, or inaccessible by the male drive device 36. Alternatively, it may be desired to have a female drive plug 37 recessed within the reel shaft opening 64, in which case the flange 61 would not be included. Also in such an embodiment the length of the first shaft 45 might be increased to access the recessed female drive plug 37 and may even have a bottom portion that is sized and shaped similar to the body 60 to support the reel shaft 38 in a cantilever arrangement.

It should be noted that, although the telescoping linkage illustrated herein is preferred, other telescoping mechanisms could be used to advance a shaft having a non-circular perimeter into an opening having a non-circular perimeter in a female drive member such as a hand operated plunger at the end of the shaft or using coil spring to bias the square shaft into the opening once properly aligned.

The square opening 50 is defined within the first end of the body 60 and, as illustrated in FIG. 5, extends about two-thirds of the length of the body towards the second end 63. Use of the telescoping assembly of the drive device 36 promotes easy insertion of the first shaft 45 into opening 50 at non-superficial depths (e.g., one-eighth, one-quarter, three-fourths, or entirely the length of the body 60) that improve power transmission from the shaft assembly through the drive plug 37 and to the reel shaft 38. Preferably, the square opening 50 flares outwardly from its long axis near the surface of the first end 62 so as to promote insertion of the first drive shaft 45 into the square opening. The opening 50 may also include rounded inner corners that additionally facilitate insertion, or may merely be a byproduct of a machining process that uses a rotating drill bit.

The square shape of the opening 50 and the approximately congruent, square shape of the first shaft 45 end promote the transmission of power from the shaft assembly to the reel shaft 38 and the web material roll 13 supported thereon. Unlike right-cylindrical openings and shafts, the non-circular perimeter of the square opening 50 and shaft 46 inhibit relative rotation therebetween. Notably, other non-circular perimeters could also be employed to promote power transmission to the reel shaft 38, such as an elliptical shape. However, the square shape has the advantage of having four corners and a like number of flat surfaces to further promote power transmission. Other non-circular perimeters with corners could also be employed, such as a triangular shape, or even an extruded star shape. However, use of increasingly complex shapes may have to be balanced with the difficulty of mating the shaft and opening, or the difficulty of manufacture of the shaft and opening. The female core drive plug 37 may be constructed of materials sufficiently durable and rigid to resist slippage of the first shaft 45 within the square opening 50, such as steel, plastic or wood fiber materials.

Referring back to FIG. 1, the frame 11 may include a pedestal 70 on which the support stand 39 is supported. The pedestal 70 portion of the stand is positioned below, and to one side of, the packaging device 10 and feeds web of plastic film material 12 upwards from the roll 13 as it is unwound. A full web material roll 13 is prepared for unwinding by rolling, or otherwise transporting the roll between two upright legs of the frame 11 into a position below the packaging device 10. The web material roll 13 is either rolled up a ramp, shimmed, or otherwise lifted into a position wherein one of the ends of the reel shaft 38 is adjacent the male drive device 36. Once adjacent, the congruently shaped square opening 50 can be oriented by adjusting the rotational position of the roll 13 and its reel shaft 38 and drive plug 37 until the corners and flat surfaces of the opening correspond to the end of the first shaft 45.

After the opening 50 has been properly positioned, a worker grips the vertically oriented grip portion 58 and moves the grip portion downwards and towards the web material roll 13. As the grip portion 58 is moved, it rotates about the pivot attachment 59 and propels the adjacent end of the swivel member 66 downwards and its opposite end in the direction of the roll 13. The reciprocating member 54 is, in turn, propelled forwards within the collar 55 which urges the vertical plate 53 forwards. As the vertical plate 53 is connected to the first shaft 45, the first shaft is advanced therewith towards the end of the reel shaft 38 and the female drive plug 37 until the square end is engaged in the square opening 50. Once engaged, power may be applied to the drive pulley 35 so as to turn the second shaft 46, the first shaft 45, the female drive plug 37, the reel shaft 38 and the roll of web material 13 so as to unwind (or wind in winding processes) the film web 12 to be filled with foamable precursors by the packaging device 10.

Figure 6:
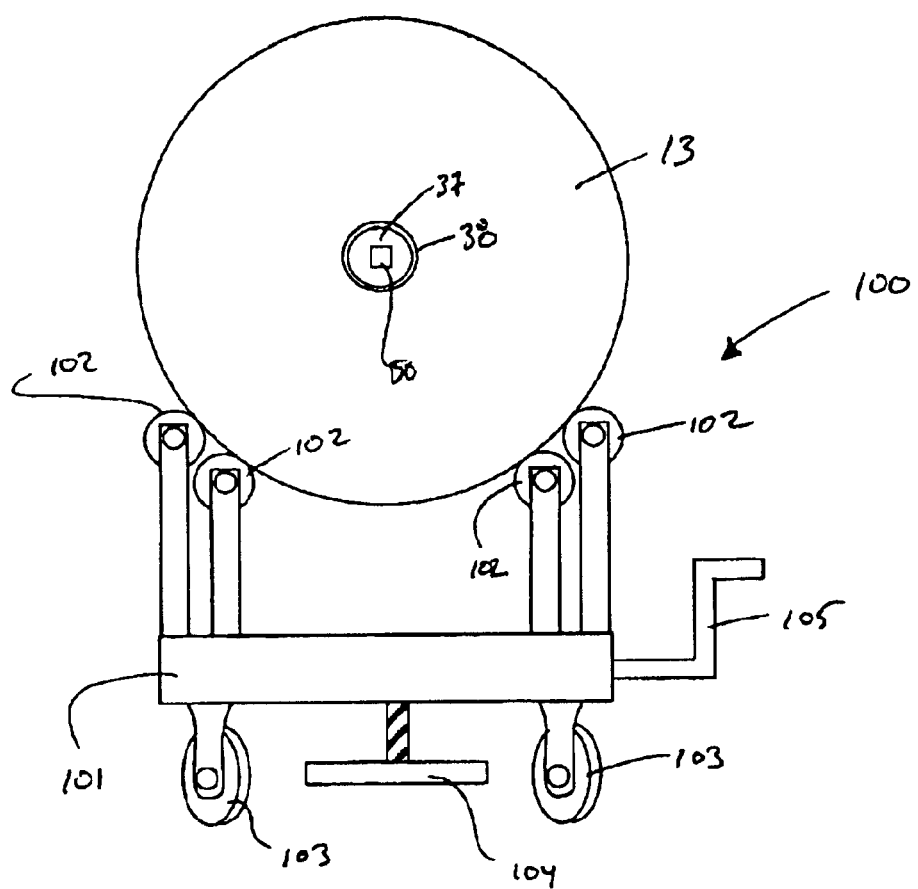
FIG. 6 is a roll support cart of another embodiment of the present invention for supporting and positioning a roll of web material so that the female core plug may be engaged by the male drive device, such as is shown in FIG. 5.

As an alternative to rolling the web material roll 13 into place, a roll support cart 100 may be employed, as shown schematically in FIG. 6. The roll support cart includes a carriage 101 that supports a group of four elongate rollers 102 that are attached at their ends to the carriage. The rollers are positioned so as to rotatably support an outer surface of the web material roll 13. Wheel casters 103 support a base of the carriage 101 that allows the cart 100, and roll 13, to be moved easily into place below the packaging device 10. The cart 100 may also include a jack device 104 with a handle that can be used to elevate the roll 13 into position adjacent to the male drive device 36. The roll 13 can be rotated to align the square opening 50 and first shaft 45 so that they may be engaged. The web material roll 13 may then be supported on the one end by the male drive device 36 and on the other end by a spring-loaded telescoping core plug 71, as shown in FIG. 1. Alternatively, the roll support cart 100 may remain in place with only one end of the reel shaft 38 connected to the male drive device 36 with the roll 13 rotating freely on the rollers 102.

The present invention has many advantages, including provision of a drive coupling between a shaft 45 and opening 50 having non-circular perimeter that promotes co-rotation of the drive shaft assembly and reel shaft 38. Overall, positively driving the unwinding process allows the use of heavy jumbo rolls which minimizes frequency of downtime during roll exchange. The use of a telescoping shaft assembly on the male drive device 36 allows the female drive plug 37 to have a relatively simple, and cost-effective construction, unlike some prior art telescoping core plugs. The engagement linkage 52 advantageously has a locked position wherein the first drive shaft 45 is locked into the square opening 50 by alignment of the reciprocating member 54 and the swivel 66. Use of the roll support cart 100 allows for easy movement and alignment of the typically heavy web material rolls 13.

Many modifications and other embodiments of the inventions set forth herein will come to mind to one skilled in the art to which these inventions pertain having the benefit of the teachings presented in the foregoing descriptions and the associated drawings. As an example, for additional power a second male drive device 36 may be coupled to a second female drive plug 37 on the opposite side of the reel shaft 38. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device for rotating a web material roll supported on a reel shaft having a pair of ends, said device comprising:

a support frame configured to rotatably support the reel shaft and the web material roll supported on the reel shaft;

a female drive member coupled to one end of the reel shaft and defining a receptacle having a non-circular perimeter;

a male drive device having a motor and a first drive shaft arranged to be rotated by the motor, wherein the first drive shaft has a drive end defining a non-circular perimeter which is congruent to the non-circular perimeter of the receptacle defined in the female drive member and wherein the drive end of the first drive shaft is engaged in the receptacle of the female drive member to place the first drive shaft in driving engagement with the female drive member, and said male drive device also having a telescoping mechanism operable to slidably advance the drive end of the first drive shaft into the receptacle of the female drive member so as to allow the motor to rotate the web material roll and to slidably withdraw the drive end from the receptacle of the female drive member to disengage the male drive device from the web material roll; and a linkage comprising a reciprocating member slidably engaged within a collar and pivotally attached to a swivel, wherein the linkage is coupled to the first drive shaft.

2. A rotating device of claim 1, wherein the non-circular perimeter has at least one corner.

3. A rotating device of claim 2, wherein the non-circular perimeter is a square shape.

4. A rotating device of claim 1, wherein the non-circular perimeter has at least one flat surface.

5. A rotating device of claim 4, wherein the non-circular perimeter is a square shape.

6. A rotating device of claim 1, wherein the male drive device includes a drive pulley system connecting the drive shaft to the motor.

7. A rotating device of claim 1, wherein the telescoping mechanism includes a second drive shaft rotatably driven by the motor and defining an axially extending opening at one end, and wherein an end of the first drive shaft opposite the drive end is slidably engaged within the opening of the second drive shaft.

8. A rotating device of claim 7, wherein the second drive shaft defines an axially extending slot and the first drive shaft includes a protuberance that extends into, and is slidable within, the axially extending slot.

9. A rotating device of claim 8, wherein the linkage is coupled to the first drive shaft such that the telescoping mechanism and linkage are operable to cooperatively advance and retract the first drive shaft within the axially extending opening of the second drive shaft.

10. A rotating device of claim 9, wherein the male drive device includes a drive pulley concentrically mounted to another end of the second drive shaft opposite the end of the second drive shaft defining the axially extending opening, said drive pulley connected by a drive belt to the motor.

11. A rotating device of claim 10, wherein the male drive device includes a support stand having a pair of aligned bearings which rotatably support the second drive shaft.

12. A rotating device of claim 9, wherein the linkage includes a hand operated lever.

13. A rotating device of claim 1, wherein the female drive member is a plug fitted into an open end of the reel shaft.

14. A rotating device of claim 13, wherein the plug includes a key that extends into a slot defined in a wall of the reel shaft.

15. A rotating device of claim 13, wherein the plug is constructed of a wood fiber material.

16. A rotating device of claim 13, wherein the plug is recessed within the open end of the reel shaft and the drive shaft includes a base portion fitted to extend between inner wall surfaces of the reel shaft.

17. A method of rotating a web material roll supported on a reel shaft having a pair of ends, said method comprising:
   positioning one of the ends of the reel shaft adjacent a male drive device;
   coupling a non-circular perimeter shaft of the male drive device to a non-circular perimeter opening defined in a female drive member at the adjacent end of the reel shaft, wherein the non-circular perimeter shaft and opening are congruent, by advancing the non-circular perimeter shaft into the non-circular perimeter opening with a linkage, wherein the linkage comprises a reciprocating member slidably engaged within a collar and pivotally attached to a swivel; and
   rotating the web material roll by rotating the non-circular perimeter shaft of the male drive device so as to dispense the web material from the web material roll.

18. A rotating method of claim 17, further comprising rotating the non-circular perimeter shaft of the male drive device into a position wherein the non-circular perimeter shaft corresponds to the non-circular perimeter opening of the female drive member prior to coupling the shaft and opening.

19. A rotating method of claim 18, wherein positioning includes moving the roll on a support cart.

20. A rotating method of claim 19, wherein positioning includes jacking the web material roll upwards to align the non-circular perimeter shaft with the non-circular perimeter opening.

21. A rotating method of claim 17, further comprising rotating the reel shaft and the female drive member until the non-circular perimeter opening corresponds to the non-circular perimeter shaft prior to coupling the shaft and opening.

22. A rotating method of claim 21, wherein rotating the reel shaft includes supporting the roll of web material on at least two rollers and rotating the roll of web material.

23. A rotating method of claim 22, wherein positioning the reel shaft includes adjusting a height of the reel shaft by adjusting a height of the roll of web material.

24. A rotating method of claim 17, wherein advancing the non-circular perimeter shaft into the non-circular perimeter opening includes actuating the linkage and sliding the non-circular perimeter shaft within an axially extending opening of a drive shaft.

25. A rotating method of claim 17, further comprising uncoupling the non-circular perimeter shaft from the non-circular perimeter opening and positioning and coupling a new web material roll and reel shaft to the male drive device.

26. A device for rotating a web material roll supported on a reel shaft having a pair of ends, said device comprising:
   a support frame configured to rotatably support the reel shaft and the web material roll supported on the reel shaft;
   a female drive member coupled to one end of the reel shaft and defining a receptacle having a non-circular perimeter;
   a male drive device having a motor and a first drive shaft arranged to be rotated by the motor, wherein the first drive shaft has a drive end defining a non-circular perimeter which is congruent to the non-circular perimeter of the receptacle defined in the female drive member and wherein the drive end of the first drive shaft is engaged in the receptacle of the female drive member to place the first drive shaft in driving engagement with the female drive member, and said male drive device also having a telescoping mechanism operable to slidably advance the drive end of the first drive shaft into the receptacle of the female drive member so as to allow the motor to rotate the web material roll and to slidably withdraw the drive end from the receptacle of the female drive member to disengage the male drive device from the web material roll;
   wherein the telescoping mechanism includes a second drive shaft rotatably driven by the motor and defining an axially extending opening at one end, and wherein an end of the first drive shaft opposite the drive end is slidably engaged within the opening of the second drive shaft;
   wherein the second drive shaft defines an axially extending slot and the first drive shaft includes a protuberance that extends into, and is slidable within, the axially extending slot;
   wherein the telescoping mechanism includes a linkage coupled to the first drive shaft and operable to advance and retract the first drive shaft within the axially extending opening of the second drive shaft;
   wherein the male drive device includes a drive pulley concentrically mounted to another end of the second drive shaft opposite the end of the second drive shaft defining the axially extending opening, said drive pulley connected by a drive belt to the motor; and
   wherein the male drive device includes a support stand having a pair of aligned bearings which rotatably support the second drive shaft.

27. A device for rotating a web material roll supported on a reel shaft having a pair of ends, said device comprising:
   a support frame configured to rotatably support the reel shaft and the web material roll supported on the reel shaft;
   a female drive member coupled to one end of the reel shaft and defining a receptacle having a non-circular perimeter;
   a male drive device having a motor and a first drive shaft arranged to be rotated by the motor, wherein the first drive shaft has a drive end defining a non-circular perimeter which is congruent to the non-circular perimeter of the receptacle defined in the female drive member and wherein the drive end of the first drive shaft is engaged in the receptacle of the female drive member to place the first drive shaft in driving engagement with the female drive member, and said male drive device also having a telescoping mechanism operable to slidably advance the drive end of the first drive shaft into the receptacle of the female drive member so as to allow the motor to rotate the web material roll and to slidably withdraw the drive end from the receptacle of the female drive member to disengage the male drive device from the web material roll;

wherein the telescoping mechanism includes a second drive shaft rotatably driven by the motor and defining an axially extending opening at one end, and wherein an end of the first drive shaft opposite the drive end is slidably engaged within the opening of the second drive shaft;

wherein the second drive shaft defines an axially extending slot and the first drive shaft includes a protuberance that extends into, and is slidable within, the axially extending slot;

wherein the telescoping mechanism includes a linkage coupled to the drive shaft and operable to advance and retract the first drive shaft within the axially extending opening of the second drive shaft; and wherein the linkage includes a hand operated lever.

28. A device for rotating a web material roll supported on a reel shaft having a pair of ends, said device comprising:

a support frame configured to rotatably support the reel shaft and the web material roll supported on the reel shaft;

a female drive member coupled to one end of the reel shaft and defining a receptacle having a non-circular perimeter;

a male drive device having a motor and a drive shaft arranged to be rotated by the motor, wherein the drive shaft has a drive end defining a non-circular perimeter which is congruent to the non-circular perimeter of the receptacle defined in the female drive member and wherein the drive end of the drive shaft is engaged in the receptacle of the female drive member to place the drive shaft in driving engagement with the female drive member, and said male drive device also having a telescoping mechanism operable to slidably advance the drive end of the drive shaft into the receptacle of the female drive member so as to allow the motor to rotate the web material roll and to slidably withdraw the drive end from the receptacle of the female drive member to disengage the male drive device from the web material roll;

wherein the female drive member is a plug fitted into an open end of the reel shaft; and wherein the plug includes a key that extends into a slot defined in a wall of the reel shaft.

29. A device for rotating a web material roll supported on a reel shaft having a pair of ends, said device comprising:

a support frame configured to rotatably support the reel shaft and the web material roll supported on the reel shaft;

a female drive member coupled to one end of the reel shaft and defining a receptacle having a non-circular perimeter;

a male drive device having a motor and a first drive shaft arranged to be rotated by the motor, wherein the first drive shaft has a drive end defining a non-circular perimeter which is congruent to the non-circular perimeter of the receptacle defined in the female drive member and wherein the drive end of the first drive shaft is engaged in the receptacle of the female drive member to place the first drive shaft in driving engagement with the female drive member, and said male drive device also having a telescoping mechanism operable to slidably advance the drive end of the first drive shaft into the receptacle of the female drive member so as to allow the motor to rotate the web material roll and to slidably withdraw the drive end from the receptacle of the female drive member to disengage the male drive device from the web material roll;

wherein the telescoping mechanism includes a second drive shaft rotatably driven by the motor and coupled to the first drive shaft such that rotation of the second drive shaft rotates the first drive shaft; and wherein the male drive device includes a support stand having a pair of aligned bearings which rotatably support the second drive shaft.

* * * * *